UNITED STATES PATENT OFFICE.

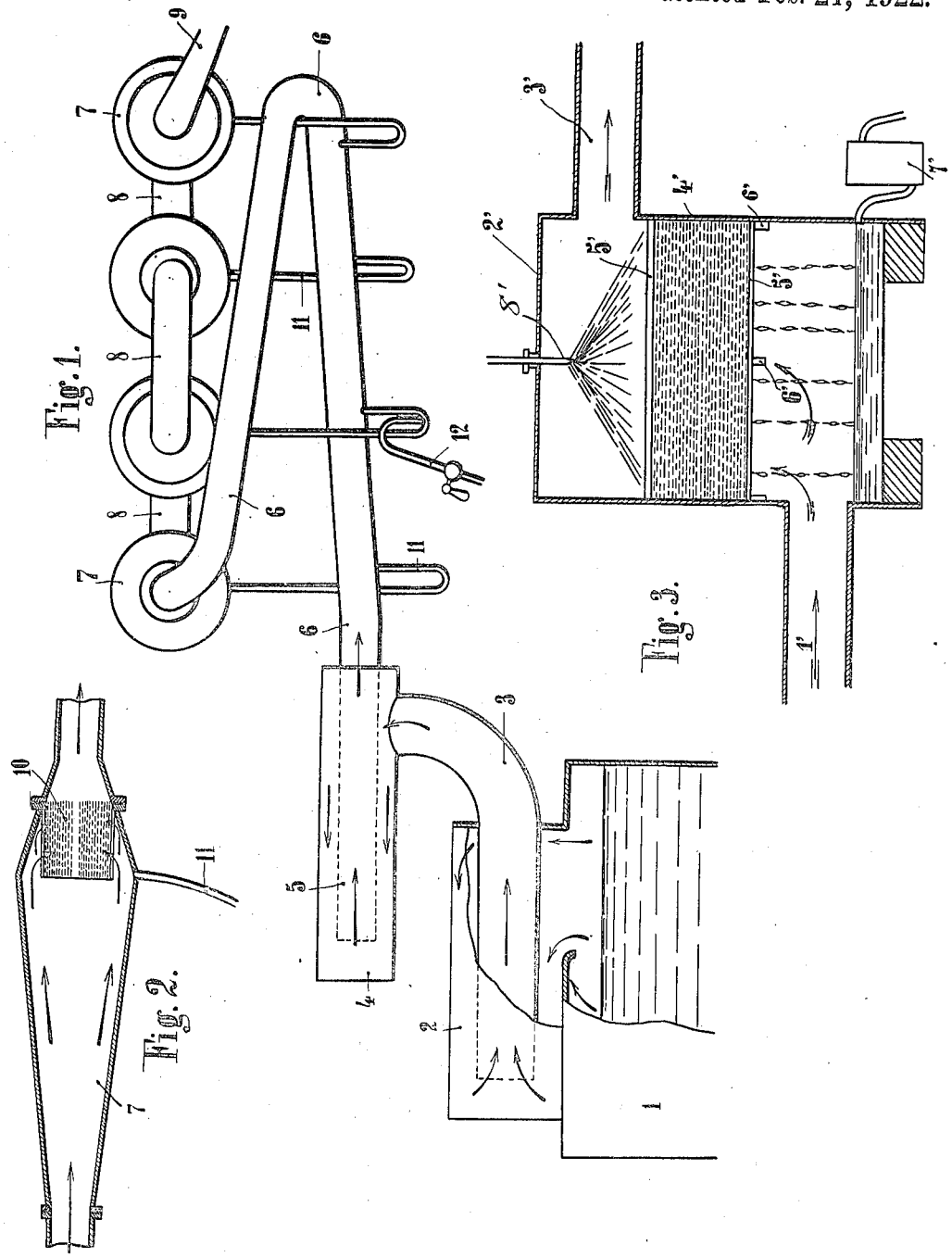

EMILE ANDRÉ RAYMOND CHENARD, OF COGNAC, CHARENTE, FRANCE; JEAN CHENARD, NICKNAMED ARMAND, EXECUTOR OF SAID EMILE ANDRÉ RAYMOND CHENARD, DECEASED.

FRACTIONAL-DISTILLING APPARATUS.

1,407,380.  Specification of Letters Patent.  Patented Feb. 21, 1922.

Application filed August 18, 1919. Serial No. 318,349.

*To all whom it may concern:*

Be it known that I, EMILE ANDRÉ RAYMOND CHENARD, citizen of the Republic of France, and resident of Cognac, Charente, France, have invented new and useful Improvements in Fractional-Distilling Apparatus, (for which I have filed applications in France August 5, 1918, and December 24, 1918,) which improvements are fully set forth in the following specification.

This invention has for its object an apparatus for effecting the fractional distillation of most liquid mixtures, whether continuously or not.

The accompanying drawings show by way of example the preferred form of embodiment of the invention.

Fig. 1 is a diagrammatic elevation of the complete apparatus.

Fig. 2 is a detail view of one of the units 7 shown in Fig. 1.

Fig. 3 shows the device used for separating tar from the gas obtained from coal, slate, brown coal and peat.

In Fig. 1, the boiler 1 is shown as having the form of a vertical cylinder on the top of which is placed, instead of the usual dome, a chamber 2, the right-hand portion of which communicates with the boiler through an opening formed in the boiler top to receive the vapors flowing out of the boiler and moving upwards into said chamber. On entering the chamber, the vapors travel therethrough from right to left, and enter the open left-hand end of a pipe 3 located centrally of said chamber, through which pipe they flow from left to right, as indicated by the arrows, and finally enter the right-hand end of a second cylindrical chamber 4 disposed above and parallel with chamber 2. The vapors flow through this chamber 4 from right to left and then enter a centrally arranged pipe 5, through which they flow from left to right. Any number of units similar to the one just described, may be used in accordance with the particular requirements, the whole set constituting an apparatus the purpose of which is hereinafter explained.

The pipe 5 projects beyond the chamber or cylinder 4 and is extended in such a manner as to form a V-shaped conduit 6, the lower branch thereof rising slightly from left to right, while the upper branch has an opposite rise from the right to the left, said conduit conducting the vapors to a series of units 7 such as shown in Fig. 2. Each unit 7 comprises a hollow casing having the form of a pair of cones arranged base to base and the various units are connected together through pipes 8 arranged in staggered relations, the number of units varying in the series in accordance with the particular purpose to be attained. From the last unit of the series, the vapors are lead through a pipe 9 to the cooling device.

The units 7 shown in longitudinal section in Fig. 2 are given this double cone shape in order to facilitate the spreading out of the current, the vapors being thus permitted to work against the outer pressure throughout the entire zone of increasing cross sectional area. During this action they undergo internally a progressive cooling which is accompanied by the progressive condensation of the less volatile constituents. Thus is obtained the kinetic and adiabatic separation of the liquid mixture to be distilled, such as a mixture of water and spirit, for instance. This process which is already described in my prior Patent No. 1,307,184, granted 17th June 1919, is distinct from the effects obtained in the usual expansion of vapors in thermal engines in so far as it is not connected to an increased volume of the vapors. The volume of the latter, on the contrary, is gradually reduced until they reach the outlet of the apparatus, when they represent in weight and volume only a very small proportion of the original body.

The set of units 7 constitutes therefore a new form of application of the same principle having for its object to intensify the work of the vapors, while reducing the size of the construction, by giving them a greater space for action.

Arranged inside each unit 7 is a cylindrical box 10 provided with large side openings and preferably filled with wire-gauze rolled in such a manner as to bring the successive layers of wire-gauze very close together, though a packing comprising metal chips, glass balls or porcelain chips may be used for the same purpose. The function of said box is essentially to sift the vapors by providing large screening surfaces, though in the form of a compact construction, upon which the vapors may deposit the liquids resulting from the adiabatic condensation in the front part of each unit, previous to their passing into the next unit. The liquid condensates percolating through the screen boxes are collected in inverted syphon pipes 11 through which they are delivered in the order of their production to the lower branch of the V-shaped conduit 6 where they meet the ascending vapors through said branch and cool them gradually, thus causing fresh condensation to take place, while they are vaporized gradually through their contact with said vapors.

The stream of liquid condensates runs down by gravity through the parts 5, 4, 3, 2 in a direction opposite to that traversed by the vapors, while exchanging gradually its heat with that of said vapors. Hence the function of the aforesaid arrangement is essentially that of a heat exchanger between the vapors flowing upwards from the boiler and the liquids condensed in the various units 7, and this function will be the better accomplished according as the liquids returning to the boiler have, when the latter is reached, a temperature and a composition which are nearer to the temperature and composition of the liquid in the boiler.

One or more of the return pipes 11 may be provided with an ordinary siphon 12 as shown in Fig. 1, which is controlled by a small cock, this arrangement enabling a partial extraction of the condensates together with the impurities which, in distilling devices, tend to become localized during the course of distillation. An automatic draining of these impurities is thus obtained, which is desirable for the success of the process.

I have mentioned hereinbefore the use of wire-gauze arranged in very close layers for catching the liquid particles entrained in the vapors, and the use of this wire-gauze has been indicated as being equivalent to that of any inert materials, as a filtering agent. The separating action is due, in reality, mainly to the fact that the particles of liquid already caught become joined together through a capillary action and form extremely thin liquid screens or films which stretch across the wires and check the flow of gas and the liquid particles carried thereby. Thus it appears that the essential function is not effected by the quite insufficient baffling action afforded by the metal itself, but is chiefly due to the fact that the wire-gauze together with the liquid enables the formation of the film-like network or screens of liquid; and the efficiency of the device depends mainly upon the two following factors, viz the mesh of the wire-gauze and the viscosity of the liquid. Moreover, each liquid particles should obtain a very high chance of meeting and being caught by an obstruction. Now the films are continually burst by passing gas or vapor and are not rebuilt at once. Hence, in order to obtain a perfect filtration, the obstacles must be multiplied by providing a great number of layers of wire-gauze. On the other hand, these webs must be very close together so as to facilitate the formation of liquid films either across the wires of the same web or across the wires of two different webs, this being due to the irregular movements of the gas or vapor resulting from impact against the wires.

Finally, it is absolutely necessary that the mesh and sizes of the wires be such as to avoid the undue resistances which would otherwise be produced, if a packing of wire-gauze having too small a mesh were to be used with a very viscous liquid. Experiments have shown that extremely high resistances might thus be produced which would interfere with the circulation of the aeriform fluid and be prejudicial to the results.

The use of wire-gauze may have been disclosed previously but it has not spread, namely in connection with distillating purposes, on account of the fact that the theory of the apparatus of the kind described was not sufficiently explained and the efficiency of the apparatus proposed was less than that of the ordinary apparatus. By operating on the principles hereinbefore indicated, on the contrary, it is easy to provide separators which will have the greatest efficiency and may be applied generally to all cases where it is useful to separate, from a gas or a vapor, the liquid carried by said vapor or gas in the form of a mist of variable thickness.

Fig. 3 shows the device proposed for separating the tar from gas obtained from coal, slate, brown coal and peat.

The gas is brought by the pipe 1' to the lower part of a metal box 2' and leaves by the pipe 3' after having passed through the separator. The latter consists of sheets of wire-gauze 4' overlying each other and held tightly together by means of two metal plates or frames 5' provided with wide openings and supported by brackets 6'. The tar stopped by the wire-gauze agglomerates and trickles down to the bottom of the box from which it is discharged through 7'.

In the case of lighting gas, the wire-gauze packing should be freely besprinkled with fresh tar before starting and the apparatus is then ready for use.

In the case of coke gas which is to be treated at a higher temperature, whereby the tar is materially less viscous, a greater number of sheets of wire-gauze of a finer mesh should be used, the operation of the apparatus being facilitated by a device such as 8' which sprinkles tar on the sheets, thus compensating for the want of viscosity and securing a perfect separation of the tar and the gas.

What I claim is:—

1. In a fractional-distillation apparatus, the combination of a boiler; and an ascending series of conduits communicating with one another in zig-zag relation, and through which the vapors rising from the boiler tend to travel in an upward direction, while the condensates obtained from said vapors tend to flow in the opposite direction by gravity back to the boiler; at least one of the conduits having its inlet portion disposed in spaced relation within the next lower conduit and terminating adjacent the rear end thereof, so that the vapors passing through said lower conduit will be caused to circulate around the said inner portion of the higher conduit in the same direction as the flow of the condensates and thereby gradually reheat the latter conduit.

2. In a fractional-distillation apparatus, the combination, with a boiler and a piping system leading therefrom; of a series of elongated, intercommunicating horizontal units, to one of which the vapors from the boiler are conveyed by said piping, each unit comprising a pair of hollow cones arranged base to base with their axes horizontal and through which the vapors circulate, whereby they are caused to work against the external pressure while gradually losing their velocity; each of said units being provided adjacent its outlet end with an internal filtering device which is disposed in the path of the vapors and which presents relatively large contact surfaces whereon the liquid particles carried by the vapors are deposited.

3. In a fractional-distillation apparatus, the combination, with a boiler and a piping system leading therefrom; of a series of elongated, intercommunicating horizontal units, to one of which the vapors from the boiler are conveyed by said piping, each unit comprising a pair of hollow cones arranged base to base with their axes horizontal and through which the vapors circulate, whereby they are caused to work against the external pressure while gradualy losing their velocity; a filtering device disposed within each unit adjacent the outlet end thereof and in the path of the vapors, to collect the liquid particles carried by the vapors; and means for returning the collected liquid particles to the piping.

4. In a fractional-distillation apparatus, the combination, with a boiler and a piping system leading therefrom; of a series of elongated, intercommunicating horizontal units, to one of which the vapors from the boiler are conveyed by said piping, each unit comprising a pair of hollow cones arranged base to base with their axes horizontal and through which the vapors circulate, whereby they are caused to work against the external pressure while gradually losing their velocity; a filtering device disposed within each unit adjacent the outlet end thereof and in the path of the vapors, to collect the liquid particles carried by the vapors; and a siphon pipe leading from each unit to the piping system for returning the collected liquid particles thereto.

5. In a fractional-distillation apparatus, the combination, with a boiler and a piping system leading therefrom; of a series of elongated intercommunicating horizontal units, to one of which the vapors from the boiler are conveyed by said piping, each unit comprising a pair of hollow cones arranged base to base with their axes horizontal and through which the vapors circulate, whereby they are caused to work against the external pressure while gradually losing their velocity; a filtering device disposed within each unit adjacent the outlet end thereof and in the path of the vapors, to collect the liquid particles carried by the vapors; a siphon pipe leading from each unit to the piping system for returning the collected liquid particles thereto; and a supplemental siphon pipe connected to at least one of the first-named siphon pipes for automatically draining the liquid therefrom and having a cock for regulating its action.

In testimony whereof I have signed this specification in the presence of two subscribing witnesses.

EMILE ANDRÉ RAYMOND CHENARD.

Witness:
J. CHENARD.